(12) United States Patent
Bailey

(10) Patent No.: US 7,120,637 B2
(45) Date of Patent: Oct. 10, 2006

(54) POSITIONAL ACCESS USING A B-TREE

(75) Inventor: Steven J. Bailey, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 10/448,584

(22) Filed: May 30, 2003

(65) Prior Publication Data

US 2004/0243553 A1 Dec. 2, 2004

(51) Int. Cl.
*G06F 17/30* (2006.01)

(52) U.S. Cl. .............................. 707/100; 707/1; 707/3; 707/102; 711/170

(58) Field of Classification Search .................... 707/3, 707/4, 101, 102
See application file for complete search history.

(56) References Cited

U.S. PATENT DOCUMENTS

| | | | | |
|---|---|---|---|---|
| 5,355,473 A * | 10/1994 | Au | ................. | 707/3 |
| 5,613,105 A | 3/1997 | Zbikowski et al. | ......... | 395/611 |
| 5,878,410 A | 3/1999 | Zbikowski et al. | ............ | 707/2 |
| 6,553,370 B1 * | 4/2003 | Andreev et al. | ................ | 707/3 |
| 6,735,595 B1 * | 5/2004 | Gobeille et al. | ............ | 707/102 |

FOREIGN PATENT DOCUMENTS

EP 1 211 612 6/2002

OTHER PUBLICATIONS

Simon Tatham; Counted B-Trees: www.chiark.greenend.org.uk/~sgtatham/algorithms/cbtree.html; May 4, 2001 (Earliest date in which the web page was published: Taken from Archive.org).*
Dutton, G., "Handling Positional Uncertainty in Spatial Databases", *Proceedings, 5th Intl Symposium on Spatial Data Handling*, 1992, 460-469.
"Counted B-Trees", www.chiark.greenend.org.uk/~sgtatham/algorithms/cbtree.html, 4 pages.
"The Art of Computer Programming", 1988, vol. 3, 463-464, XP-002373347.

* cited by examiner

*Primary Examiner*—Jeffrey Gaffin
*Assistant Examiner*—Gerald Cabrera
(74) *Attorney, Agent, or Firm*—Woodcock Washburn LLP

(57) ABSTRACT

A b-tree having information stored therein is utilized to facilitate positional access of elements stored in the leaves of the b-tree. The b-tree is structured such that for each non-leaf level value, a count is located to its immediate left and a value is located to its immediate right. These left and right counts indicate the number of leaf level values located in the leaves of the sub-trees to the immediate left and right of the value. The left and right counts are used to determine the path to take when descending the b-tree in search of a specific position. The counts can also be utilized to determine the total number of values in the leaf level of the b-tree.

3 Claims, 12 Drawing Sheets

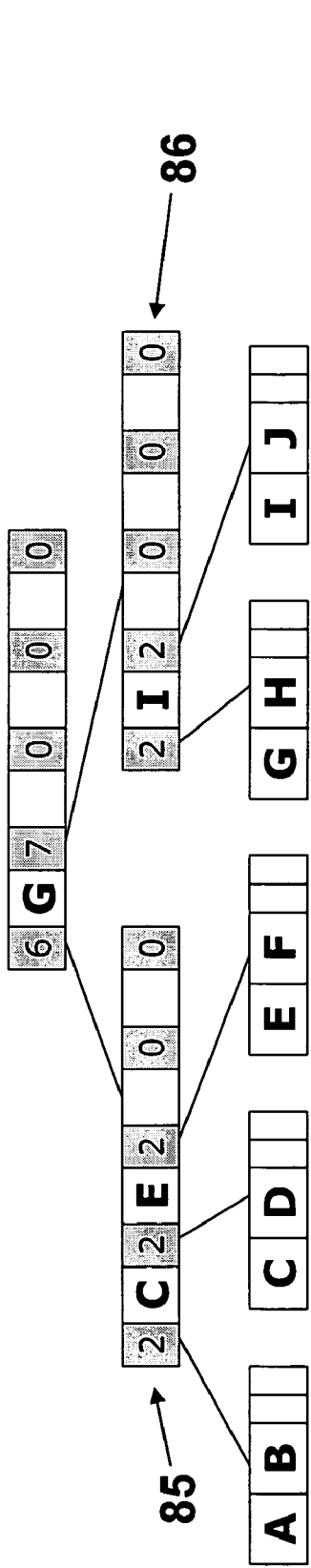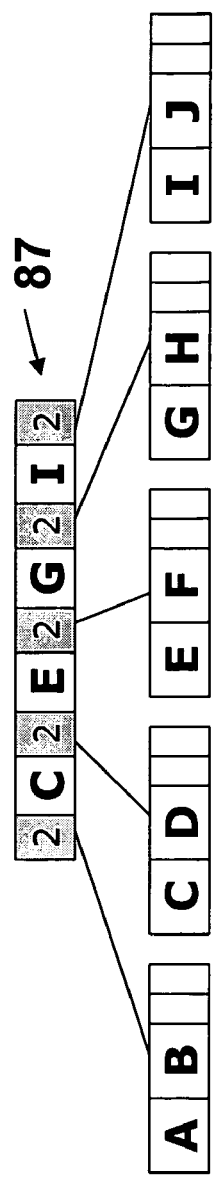
FIGURE 9

POSITIONAL ACCESS USING A B-TREE

FIELD OF THE INVENTION

The present invention is generally related to data processing and more specifically to positional access of elements in a b-tree.

BACKGROUND OF THE INVENTION

A balanced tree (b-tree) is a data structure often used to store data in a sorted order. B-trees are particularly applicable to database operations in which access to large amounts of data in a sorted order is typically required. Using a b-tree to store data allows data in the b-tree to be easily retrieved in sorted order. It is also possible to use the sorted order to access individual data items in the b-tree based on their ordinal position within the sorted order (e.g., the $n^{th}$ item in a sorted set of data). This type of access is known as positional access.

Positional access utilizing a b-tree conventionally includes computing or approximating the position of a data item in the b-tree. For example, if a b-tree stores $2n$ different values in its leaves, then using the assumption that a b-tree distributes data roughly evenly from left to right it can be estimated that the $n^{th}$ sorted item appears roughly halfway across the leaf level of the b-tree. However, the exact size of a b-tree, and the exact distribution of data across the b-tree, is not typically known when a search begins. That is, the exact number of values in leaf nodes of the b-tree, as well as how evenly distributed those values are, may not be known. Thus, if all that it known about a sought item is that it is the $n^{th}$ item in a sorted order, it can still be difficult to locate the item with precision. Moreover, it is difficult even to confirm how accurate the estimate is, since in general, determining whether a given data item is the $n^{th}$ data item involves traversing the tree down to its leaves to determine how many data items precede the given data item. Therefore, a technique for positional access utilizing a b-tree that does not suffer the above disadvantages is desired.

SUMMARY OF THE INVENTION

A b-tree, in accordance with the invention, is configured to store information that can be used to facilitate locating a value or data item at a specific ordinal position, or to perform other positional access operations. The b-tree is structured such that each index value in a non-leaf-level node is associated with a left count and a right count. These left and right counts indicate the number of leaf level values located in the sub-trees immediately to the left and right, respectively, of the index value. The left and right values are used to determine the path to take when descending the b-tree in search of a data item having a specific ordinal position.

A method for searching for an element located at a predetermined position of the b-tree includes evaluating index values in a root node of the b-tree from left to right. If the ordinal position of the sought data item is less than or equal to the first left count encountered, then the left-most sub-tree of the root is selected. Otherwise, the left count is added to a running count. If the ordinal position of the sought data item is less than or equal to the sum of the running count and the right count, then the sub-tree immediately to the right of the current index value is selected. However, if the ordinal position of the data item sought is greater than the above-mentioned sum, then the right count is added to the running count and the index values are considered from left to right, determining if the ordinal position of the sought data item is less than or equal to the new sum. The process of adding each index value's right count to the running count, and determining whether the sought ordinal position is less than or equal to sum of the running count and the current index value's right count is repeated, until an index value meeting that condition is found. That index value's immediate right sub-tree is then selected. The selected sub-tree is then descended, and the process is reiterated (with the running count being maintained from iteration to iteration) until the leaf level of the b-tree is encountered. The running count corresponds to the data items that are stored in leaf nodes to the left of the current node. Thus, the predetermined position of the element in the leaf level of the b-tree is located by subtracting the running count from the ordinal position of the sought data item, and using the difference to select a particular item within the current leaf-level node.

Other features of the invention are described below.

BRIEF DESCRIPTION OF THE DRAWINGS

The features and advantages of the present invention will be best understood when considering the following description in conjunction with the accompanying drawings, of which:

FIG. 9 is an illustration of combining a non-leaf node with its left sibling to form a combined node and updating leaf-level-count elements in accordance with an exemplary embodiment of the present invention;

DETAILED DESCRIPTION OF ILLUSTRATIVE EMBODIMENTS

Positional access of elements of a balanced tree ("b-tree"), as described herein provides efficient and accurate positional access operations on a b-tree based index. In one embodiment of the present invention, count information is stored in the underlying b-tree data structure that can be used to efficiently support positional access operations, such as locating a particular element in the b-tree. For each non-leaf level index value in the b-tree, counts are stored to the left and right of the index value. These left and right counts are referred to as the left-leaf-count (or "left count") and the right-leaf-count (or "right count"), respectively. The left-leaf-count element indicates the number of data items in the leaf level of the sub-tree immediately to the left of the index value. The right-leaf-count element indicates a root node of a right sub-tree of the b-tree and also indicates the number of values in the leaf level of the right sub-tree. The count information assists in positional access by allowing it to be determined, by examining a given node, which sub-tree of the node contains a data item having a particular ordinal position. The count information can also be used to determine the total number of valued elements in the leaf level of the b-tree, by adding up all of the counts in the root node.

Overview of a Suitable Computing System Environment

Figure 1:
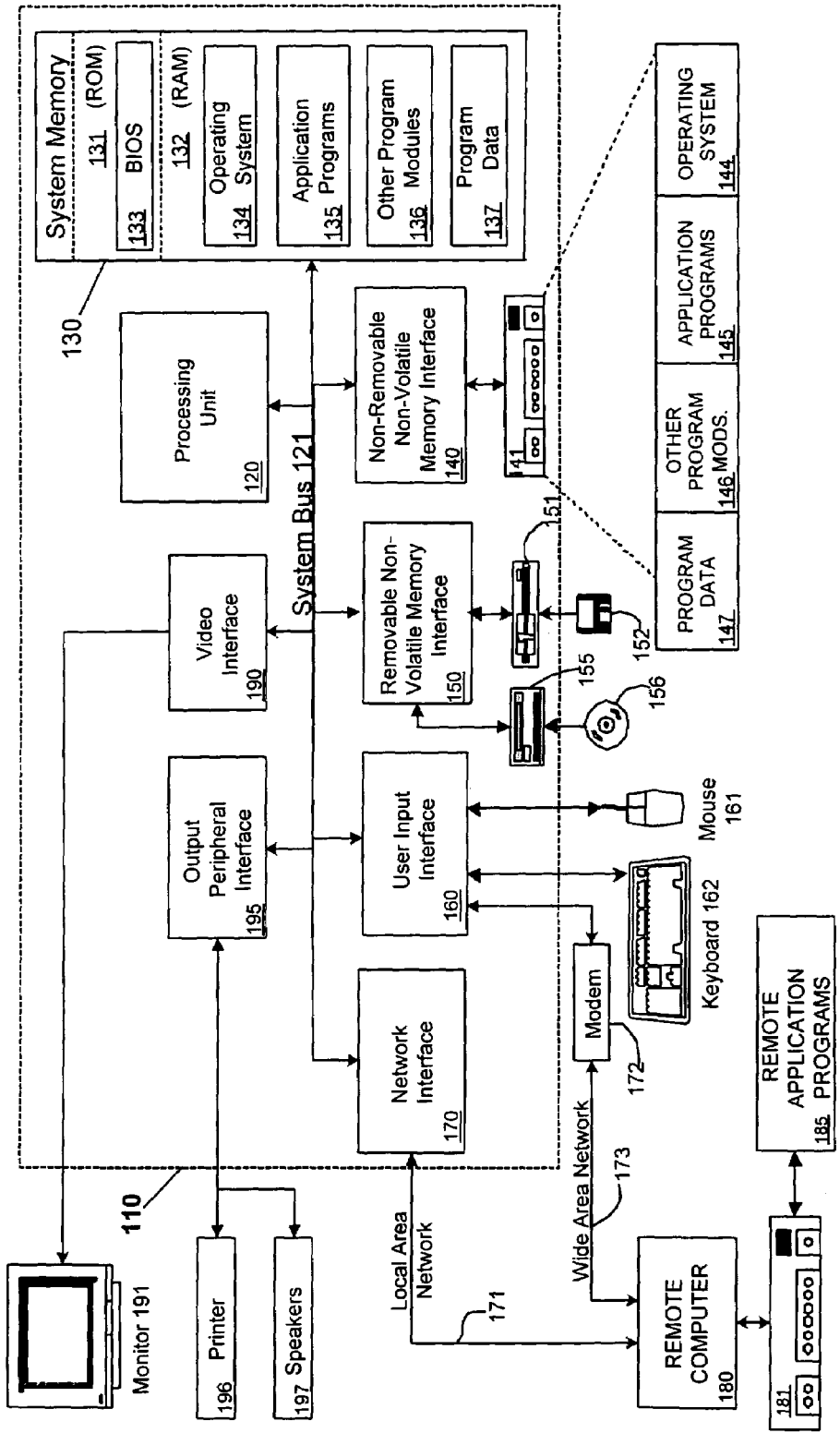
FIG. 1 illustrates an example of a suitable computing system environment in which the method and system for positional access using a b-tree in accordance with an exemplary of the present invention may be implemented.

FIG. 1 illustrates an example of a suitable computing system environment 100 in which the method and system for positional access using a b-tree may be implemented. The computing system environment 100 is only one example of a suitable computing environment and is not intended to suggest any limitation as to the scope of use or functionality of the method and system for dynamically and individually controlling display elements. Neither should the computing environment 100 be interpreted as having any dependency or requirement relating to any one or combination of components illustrated in the exemplary operating environment 100.

The method and system for positional access using a b-tree are operational with numerous other general purpose or special purpose computing system environments or configurations. Examples of well known computing systems, environments, and/or configurations that may be suitable for use with the method and system for dynamically and individually controlling display elements include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method and system for positional access using a b-tree may be described in the general context of computer-executable instructions, such as program modules, being executed by a computer. Generally, program modules include routines, programs, objects, components, data structures, etc. that perform particular tasks or implement particular abstract data types. The method and system for positional access using a b-tree may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the method and system for positional access using a b-tree includes a general purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. It is to be understood that combinations of any of the media are also included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, are typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM, CDRW, or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in. light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the method and system for dynamically and individually controlling display elements may also be implemented via an operating system, application program interface (API), or a "middle man" object between a coprocessor and requesting object, such that services may be performed by, supported in, or accessed via all of NET's languages and services, and in other distributed computing frameworks as well.

Positional Access in a B-Tree using Count Information

Figure 2:
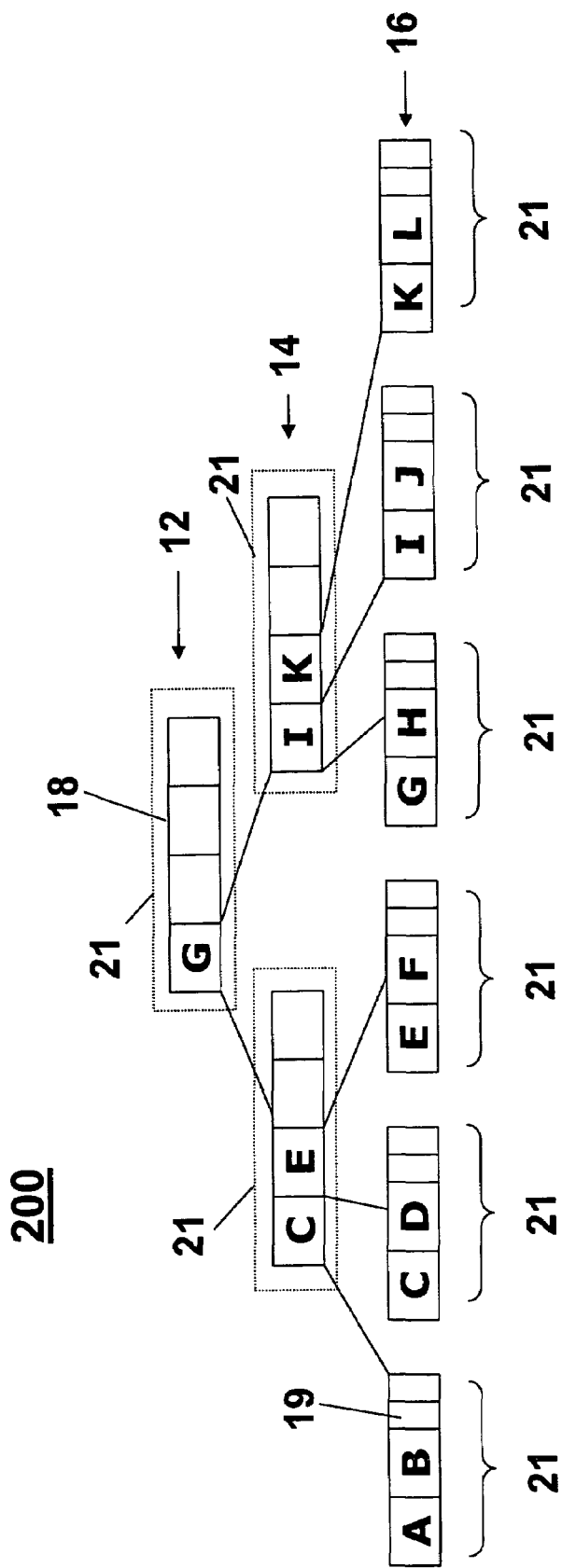
FIG. 2 illustrates an exemplary b-tree structure.

A b-tree is a data structure that is used to hold a collection of values in a sorted order. Each value is stored in, or referenced by, an element in the leaf-level of the b-tree. Each node of a b-tree typically contains space for n values (e.g., n=4). Some of the values may be unused or "empty." As used herein, a space or element that contains a value shall be referred to as a "valued element," and a space or element that is empty shall be referred to as a "non-valued element." FIG. 2 illustrates an exemplary b-tree structure 200. The b-tree 200 comprises levels, indicated as levels 12, 14, and 16. The top level 12 if referred to as the root level. The bottom level 16 is referred to as the leaf level. Any level other than leaf level 16 is referred to as a non-leaf level. Level 14 is a non-leaf level, as is root level 12. A tree may have many non-leaf levels. A b-tree may have only one root level (which is, thus, a root level and a leaf level). Each level has one or more nodes 21 and each node 21 may comprise one or more elements 18. Root level 12 has only a single node, which is referred to as the root node. Nodes in the leaf level 16 are referred to as leaf nodes, and nodes in non-leaf levels are referred to as non-leaf nodes. In practice, the values stored in the leaf level are the actual values that may be sought by an application, and the values stored in a non-leaf level are "index values" that are used to identify where the actual values are located at the leaf level. (It should be understood, however, that the index values and the actual values typically have the same domain—e.g., if the tree is being used to store letters A–Z, then the elements in both the leaf and non-leaf levels store letters ranging from A–Z, although the purpose of storing such a letter in a non-leaf level is typically to identify which sub-tree of a non-leaf level node the letter being sought is contained in.)

Exemplary tree 200 has three non-leaf nodes and six leaf nodes. A node may have one or more elements 18. Only one element 18 in the root node in the root level 12 is marked as such for the sake of clarity. An element contains a value that is capable of being put in some positional order within the tree. Each element 18 may contain a value, indicated by the letters A, B, C, D, E, F, G, H, I, J, K, and L, in FIG. 2. In the example of FIG. 2, element 18 is a non-valued element (since it does not contain a value), and the left-most element in node 21 is a valued element (since it contains the value G). It is to be understood that the tree structure represents an organization of values, and as such values need not literally be stored together, but could be merely logically associated in a manner consistent with tree structure 200. Thus, references to a value being "contained" or "stored" in a tree, shall be understood to represent any situation in which values are associated with each other, or organized, according to a tree structure.

The exemplary b-tree 200 starts with a root node (in level 12), which contains the value "G". There are 5 values (G, C, E, I, and K) stored in the non-leaf nodes and 12 values (A, B, C, D, E, F, G, H, I, J, K, and L) stored in the leaf nodes. The non-leaf nodes and values are used as a directory to facilitate a search to a leaf node when looking for a specific value or position. Most searching algorithms that use b-trees call for descending the tree all the way to a leaf in order to find the sought value, although other types of search techniques may utilize values at all levels of the b-tree such that when a match is found, the search is complete and can end before a leaf node is reached.

Figure 3:
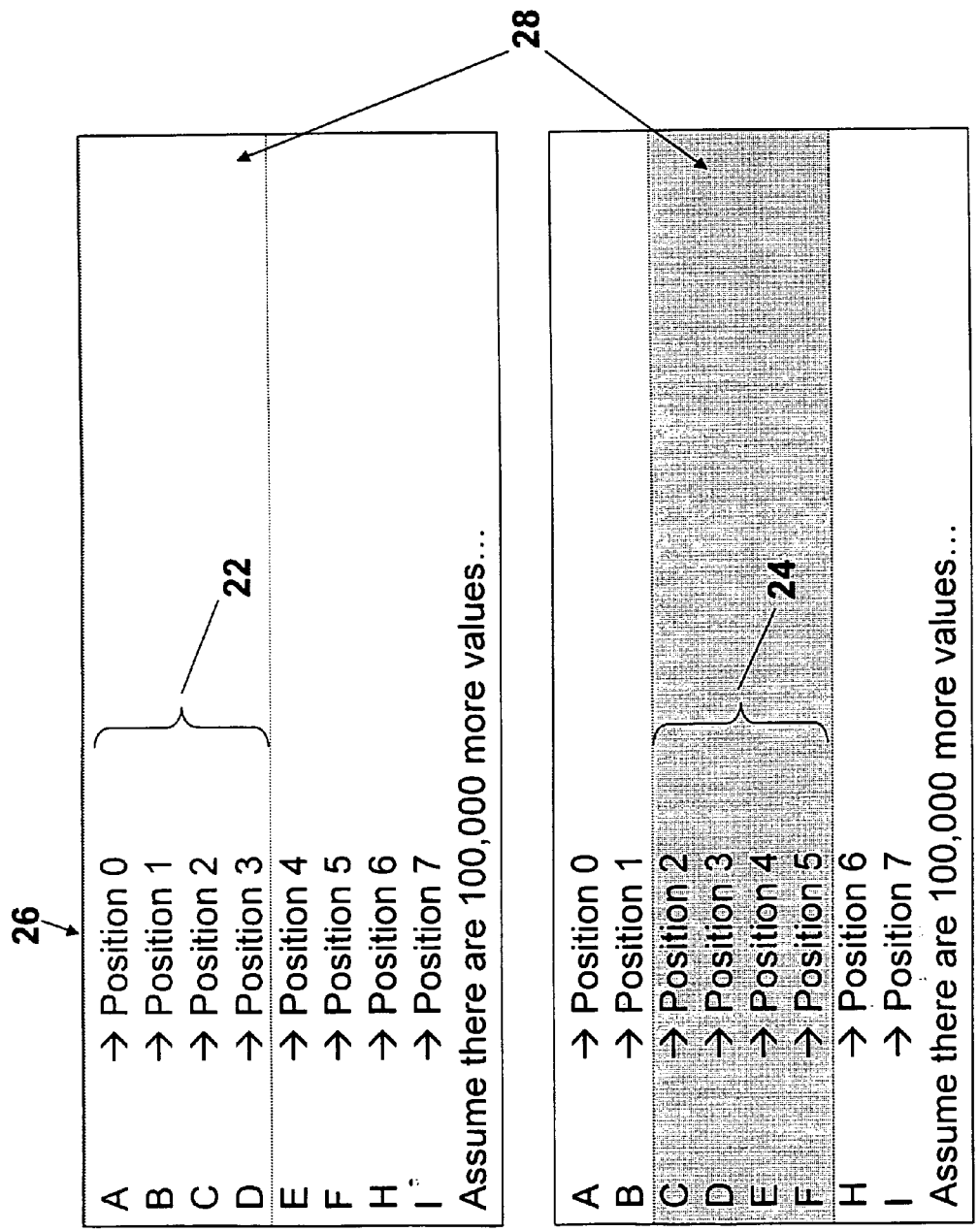
FIG. 3 is an illustration of a relatively large list of items from which relatively smaller groups of items are selected utilizing positional access of a b-tree in accordance with an exemplary embodiment of the present invention.

B-trees may be used to perform positional access for a variety of applications. Position-based operations include: locating a value at a specified ordinal position; when inserting a new value, getting the position at which the value was inserted; and when deleting a value, getting the position at which the value was deleted. Examples of locating values at specified positions include locating a single item at a particular ordinal position (e.g., the $n^{th}$ item in a sorted set), or locating a subsequence of items in a list containing a large number of ordered items (e.g., e-mails numbered m through n in a list containing a large number of e-mail that have been sorted in some order). FIG. 3 is an illustration of a large list of values 26, from which smaller groups of items, groups 22 and 24, are to be rendered on the display 28 by some application (e.g., an e-mail application). This exemplary application includes rendering a list of values, such as a list of e-mail messages 26 on a display 28. For example, each of the items in list 26 might be a summary of an e-mail message, and groups 22 and 24 may each contain the number of e-mail message summaries that can fit into a display window. It is not uncommon for this type of list to be quite large (e.g., greater than 10,000 values). To mitigate the detrimental effects on performance and to lessen the amount of memory utilized, the entire list 26 is not loaded into memory and rendered at once. Rather, portions of the list are loaded into memory and rendered. As depicted in FIG. 3, the display 28 renders only four items from the list 26 at any one time. In this example, it may be the case that only four values of the list 26 are stored in memory and/or displayed at a time. The two groups of items, 22 and 24, depict what a user may see if she initially views group 22 and then scrolls the list 26 ahead by two items. Initially the group of items 22 is rendered, and subsequently, the group of items 24 is rendered. The group of items 22 includes value A associated with position 0, value B associated with position 1, value C associated with position 2, and value D associated with position 3. The group of items 24 includes value C associated with position 2, value D associated with position 3, value E associated with position 4, and value F associated with position 5. It is to be understood that the above described application utilizing positional access is merely exemplary, and that one can imagine a number of other examples of application utilizing positional access.

Figure 4:
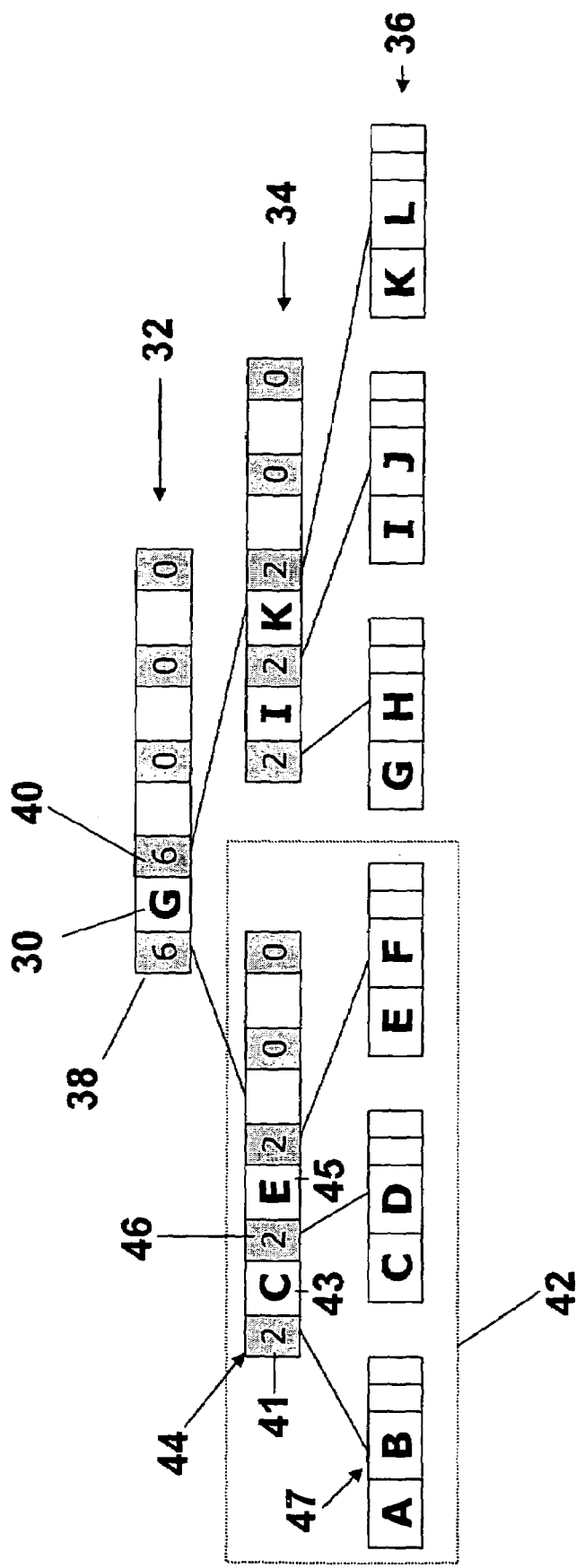
FIG. 4 is an illustration of a b-tree comprising left and right leaf-level-count elements, in accordance with an exemplary embodiment of the present invention.

FIG. 4 is an illustration of a b-tree comprising leaf-level-count elements, in accordance with an exemplary embodiment of the present invention. These leaf-level-count element may be used to identify an element by its ordinal position, using a technique described below in connection with FIG. 5. Information is stored in the underlying b-tree data structure in the form of leaf-level-count elements (e.g., 38 and 40). Leaf-level-count elements are positioned to the left and right of each non-leaf valued element. (It will be understood that trees are typically regarded as having a logical left-to-right organization, and the positioning of count elements to the "left" and "right" of an element should be understood as corresponding to this logical left-to-right organization; the invention does not require a physical left-to-right organization of data.) As depicted in FIG. 4, the left-leaf-count 38 is shown as being positioned adjacent and left of the valued element 30 (value G). The right-leaf level-count element 40 is shown as being positioned adjacent and right of the valued element 30. (It will be understood that the invention does not require that the left and right counts be positioned "adjacent" to valued elements, as long as each valued element has a left count and a right count.) Typically, a leaf-level-count element (other than the left-most count and the right-most count) functions as both a left count for one valued element, and a right count for another valued element. For example, leaf-level-count 46 functions as a right-leaf-level-count element for valued element 43 and as a left-leaf-level-count element for valued element 45. Leaf-level counts may be embodied in various other ways.

Each leaf-level-count element comprises a value indicative of the total number of data items in the leaf level of one of the sub-trees of a node. In particular, if a valued element's left and right counts are n and m, respectively, then the sub-tree immediately to the left of the valued element contains n data items in its leaf level, and the sub-tree immediately to the right of the valued element contains m elements in its leaf level. For example, left-leaf-count 38 corresponds to the sub-tree 42 having root node 44. The left-leaf-count element 38 also contains a value, 6, which indicates the number of data items (e.g., valued elements) in the leaf-level of sub-tree 42. As shown in FIG. 4, the sub-tree 42 has 6 valued elements (A, B, C, D, E, and F) in its leaf level, which agrees with the value placed in left-leaf-count 38. The sub-tree includes all nodes in the leaf level and includes all elements branching from down to the leaf level of the b-tree. As can be seen in FIG. 4, each leaf-level-count element (other than those marked "0") corresponds to a respective sub-tree. For example, the left-leaf-level-count element 41 points to the sub-tree 47 which contains only the node comprising two valued elements (values A and B) and two non-valued elements. Every sub-tree is not labeled as such in FIG. 4 for the sake of clarity.

Figure 5:
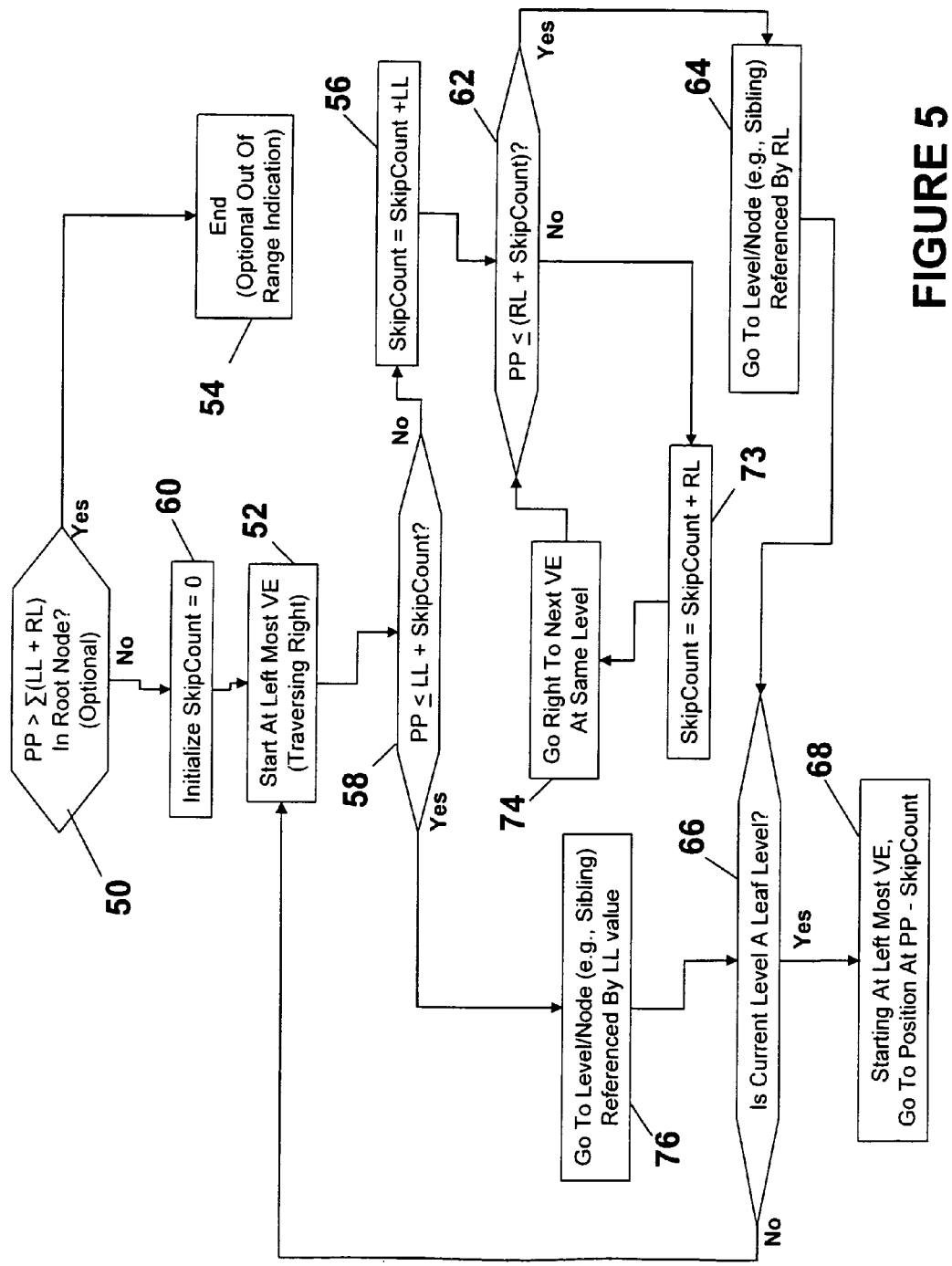
FIG. 5 is a flow diagram of an exemplary process for locating an element located at a predetermined position in a b-tree in accordance with an exemplary embodiment of the present invention.

FIG. 5 is a flow diagram of an exemplary process for identify an element located at a predetermined ordinal position on the leaf level of a b-tree. Generally, the left and right leaf-level-counts elements are utilized to determine which path to take to descend the b-tree, and to determine how many values appear to the left of the current position. Once the leaf level of the b-tree is reached, the difference between (a) the number of leaf level values to the left of the current leaf node and (b) the ordinal position that is sought is used to locate the predetermined position. It is to be understood that, while b-trees are typically traversed from left to right, the orientation of the process shown in FIG. 5 may be reversed to perform the process from right to left. It will further be recalled that left-to-right orientation is a logical, not physical, orientation, and thus what constitutes "left" and "right" is subject to definition of the tree's designer. (Typically, the tree is organized so that values on the logical "left" precede those on the logical "right.") The following description of the process depicted in FIG. 5 may be more easily understood with reference to FIG. 4, examples of which are included. The following abbreviations are used in FIG. 5:

PP—predetermined ordinal position of the data item sought
LL—left-leaf-count element value
RL—right-leaf-count element value
VE—valued element Before starting the b-tree traversal, the predetermined ordinal position may be checked to ensure it is within range—i.e., that it is not greater than the number of valued elements in the leaf level of the b-tree. At optional step 50, it is determined if the predetermined position value is greater than the sum of the leaf-level-count element values in the root node of the b-tree. Because the sum of all the leaf-level-count element values in the root node of the b-tree is equal to the total number of leaf level valued elements of the b-tree, if the predetermined position is greater than this sum, then the predetermined ordinal position is out of range. If the predetermined ordinal position is greater than this sum (step 50), the search may end at step 54, and an indication that the predetermined position is out of range may be provided. At step 60, the counter, skipcount, is initialized. This counter may be initialized to an appropriate value, such as zero. Skipcount is a counter that accumulates the values of the leaf valued elements that are skipped (i.e., those elements that are known to be to the left of the current node) during the traversal of the b-tree. This accumulated value is used to locate the predetermined position once the leaf level of the b-tree is reached.

Starting at the left most valued element in the root node of the b-tree (e.g., valued element 30 in FIG. 4), the root node is examined from left to right at step 52. The predetermined position is compared with the sum of the value (e.g., 6) of the left-leaf-count element (e.g., valued element 30) that is positioned adjacent and right of the current valued element (e.g., 30), and the current value of skipcount. If the ordinal number of the predetermined position is less than or equal to this sum, then the b-tree is traversed to the node referenced by the left-leaf-level-count element (e.g., 38) at step 76. This node will be located in the next lower level of the b-tree. It is determined if the current level is a leaf level at step 66. If the current level is a leaf level, then the difference of the predetermined position minus the skipcount value is determined at step 68. The predetermined position sought is located by starting at the left most valued element in the leaf level and moving to right by the number of valued elements equal to the difference. If, at step 66, the current level is not a leaf level, the traversal process starts again at the left most valued element of the current level (step 52).

Returning to step 58, if it is instead determined that the predetermined position is greater than the sum of the left-leaf-level-count element value and the counter skipcount, skipcount is incremented by the value of the left-leaf-level-count element at step 56. Thus, as each left-leaf-level-count element is encountered from left to right, the skipcount maintains a running sum of (accumulates) the encountered left-leaf-level-count element values, which represents the total number of leaf-level value elements that have been "skipped" over by traversing a particular branch of the tree. At step 62 it is determined if the predetermined position is less than or equal to the sum of the right-leaf-level-count element value plus the skipcount value. If it is, then the b-tree is traversed to the node referenced by the right-leaf-level-count element at step 64. It is determined if the current level is a leaf level at step 66. From this step (66) the process is as described above. At step 62, if the predetermined position is not greater than the right-leaf-level-count element value, then skipcount is incremented by the value of the current right-leaf-count element at step 73, and the current node level is traversed from right to left to the next valued element at step 74. The process proceeds to step 62, and continues as described above.

An example search process is described below with reference to both FIG. 4 and FIG. 5. For purposes of this example, assume that the data being sought is that which appears in the $10^{th}$ ordinal position of all the sorted data stored in the leaves of the b-tree, which correspond to value J in FIG. 4. Initially, the value 10 is compared with the sum of 6+6 (step 50). Because 6+6=12, which is less than 10, the counter, skipcount, is initialized to 0 at step 60, the process continues at step 52, at which the search process starts at valued element 30. The value 10 is compared to 6 at step 58 (i.e., the count appearing to the left of valued element 30). Because 10 is greater than 6, the process continues at step 56, at which the counter, skipcount, is incremented by 6, resulting in skipcount being equal to 6. Next the value 10 is compared with the value 6+6 at step 62. Because 10 is less than 12, the process continues at step 64. The b-tree is then traversed starting at the node referenced by the leaf-level-count 40 (step 64), which is the right most node in non-leaf level 34 (the node containing values I and K). Because the current level (level 34) is not a leaf level (step 66), the process continues at step 52. Starting at the valued element containing value I (step 52), the value 10 is compared with the value 2+6=8 (step 58). Because 10 is greater than 8, skipcount is incremented to 6+2=8, at step 56. The value 10 is compared to the sum of 2 (right-leaf-level-count value) +8 (current value of skipcount) at step 62. Because 10 (the sum) is equal to 10 (the ordinal number of the predetermined position sought), the process continues at step 64, at which, the b-tree is then traversed starting at the leaf node (containing I and J) in leaf level 36. Because this is a leaf level (step 66), the value of skipcount (8) is subtracted from the value of the predetermined position (10), resulting in 2 (step 68). In accordance with step 68, the search process then proceeds to the left most valued element (value I) in the current leaf node, and counts from left to right the number of the calculated difference (2). This results in the location of the predetermined position being at the valued element containing the value J.

In another embodiment, a b-tree containing left and right leaf-count elements in the root node of the b-tree as described herein provides the ability to determine the total number of valued elements in the leaf level of the b-tree.

This is accomplished by summing the values of the left and right leaf-level-count elements located in the root node of the b-tree.

As described above, position-based operations include: locating a value at a specified position, when inserting a new value, getting the position at which the value was inserted, and when deleting a value, getting the position at which the value was deleted. When a valued element is inserted and/or deleted, the b-tree is updated by updating the values in the appropriate left and right leaf-level-count elements at all the appropriate levels. The actual changing of the leaf-level-count-element values may be accomplished by any appropriate means for updating a b-tree. The leaf-level-count element values may be updated at the same time as element values in the b-tree are being updated.

As valued elements are added and/or deleted, a b-tree may expand and/or shrink. Typically, a b-tree expands by splitting levels, thus having more nodes. Typically, a b-tree shrinks by combining nodes. A node in a b-tree is split when the number of values in the node has exceeded a specified threshold (often referred to as a split threshold). A node in a b-tree is shrunk when the number of values in the node has gone below a specified threshold (often referred to as a shrink threshold). Typically, when a node has reached its shrink threshold, an attempt is first made to combine the node with either its left or right sibling. However, if the node cannot be combined with a sibling, then values are redistributed from the left or right sibling. Examples of b-trees with inserted and deleted elements are described below. These examples include splitting a root node of a leaf level, splitting a root node of a non-leaf level, combining a leaf level node with a left sibling node, combining a non-leaf level node with a left sibling node, redistributing values from a leaf level node, and redistributing values from a non-leaf level node. It is to be understood that, in practice, algorithms for splitting and shrinking a b-trees vary widely depending on the specific type of the b-tree structure being used.

Figure 6:
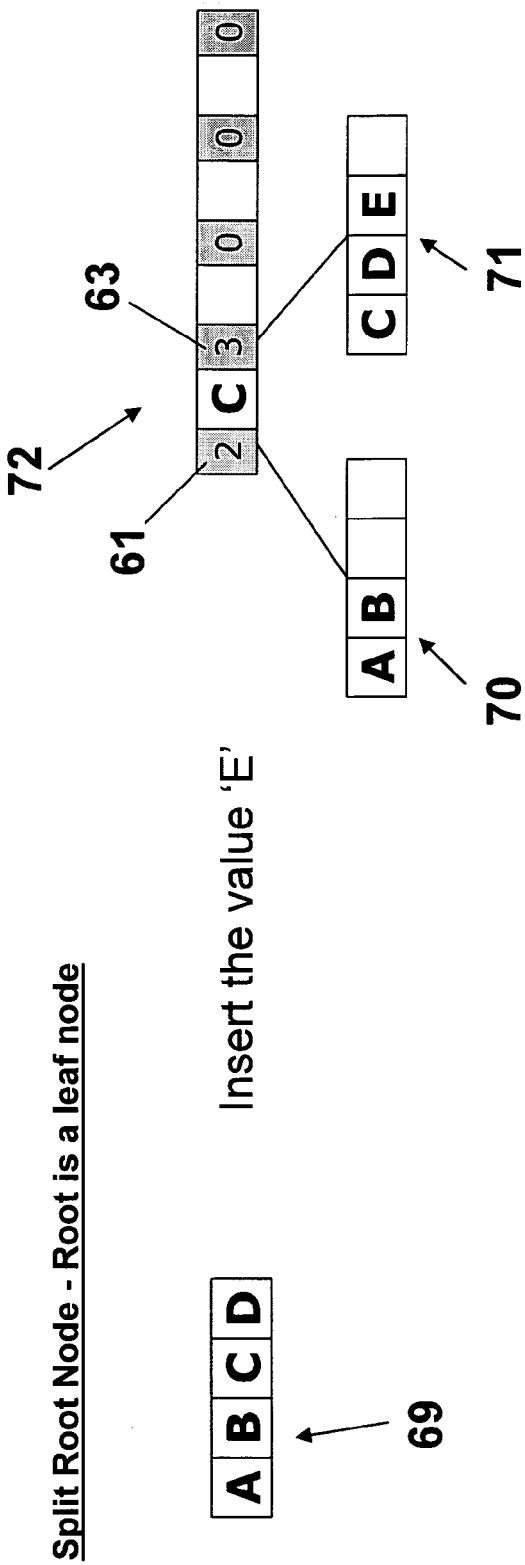
FIG. 6 is an illustration of a leaf level root node being split to insert a valued element and updating leaf-level-count elements in accordance with an exemplary embodiment of the present invention.

FIG. 6 is an illustration of a leaf level root node 69 being split to insert a valued element having the value "E", resulting in leaf level nodes 70 and 71, and non-leaf level node 72. An attempt is made to insert the value "E" is inserted to the full node 69. As depicted in FIG. 6, two new leaf nodes 70 and 71 are allocated, and the values are distributed evenly between these two new leaf nodes 70 and 71. The middle value "C" is promoted into the new root node 72 and the values of the left-leaf-count 61 and right-leaf-count 63 are updated accordingly to reflect that there are two leaf level values to the left of "C", and three leaf-level values to the right of "C" (The leaf-level value "C" is stored in the sub-tree that is to the right of "C" in the root node; by convention values that are equal to or greater than the index are stored to the right.). As shown in FIG. 6, the updated b-tree structure comprises left and right leaf count values indicating the number of values in the leaf nodes, and each left/right-leaf count value represents, or indicates, a root node of a sub-tree. For example, node 72 comprises leaf-count values of 2 and 3, indicative of nodes having valued elements, AB and CDE, respectively.

Figure 7:
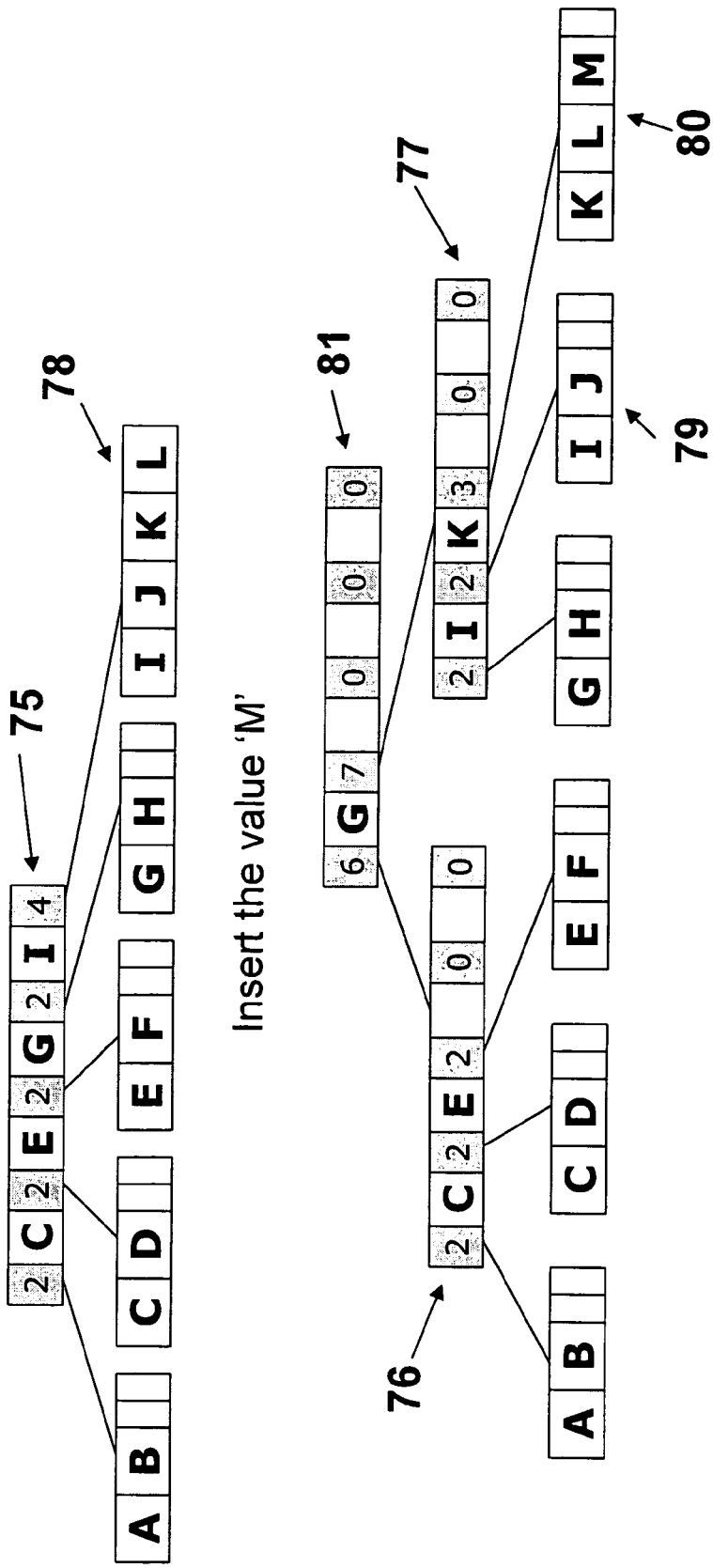
FIG. 7 is an illustration of a non-level root node being split into two nodes to insert a value and updating leaf-level-count elements in accordance with an exemplary embodiment of the present invention.

FIG. 7 is an illustration of a non-leaf-level root node 75 being split into two nodes 76 and 77 to insert the value "M" in the leaf level of the b-tree. The b-tree depicted in FIG. 7 is originally two levels deep. The root node 75 is full, and the leaf node 78 in which the new value of 'M' is to be inserted is also full. Inserting 'M' into this b-tree results in two node splits. The root node 75 is split into nodes 76 and 77, and the node 78 is split into nodes 79 and 80. The values from the full root node 75 are distributed evenly between the two new nodes 76 and 77, which now contain 'C', 'E' and 'I', 'K', respectively. The value 'G' is promoted to the new root node 81. The leaf-level-count-element values stored in the root node 81 represent the number of values in the leaf nodes. The desired leaf-node in which to insert "M" is full. A new node 80. The values "I", "J", "K", "L", and "M" are distributed evenly across the two nodes 79 and 80. The middle value "K" is promoted into the parent node 77 and the leaf counts in the in the parent node 77 are updated to reflect the split—e.g., by the process discussed below in connection with FIG. 12. As shown in FIG. 7, the updated b-tree structure comprises left and right leaf count values indicating the number of values in the leaf nodes, and each left/right-leaf count value represents, or indicates, a root node of a sub-tree. For example, node 76 comprises leaf-count values of 2, 2, and 2, each indicative of a node having two valued elements, AB, CD, and EF.

Figure 8:
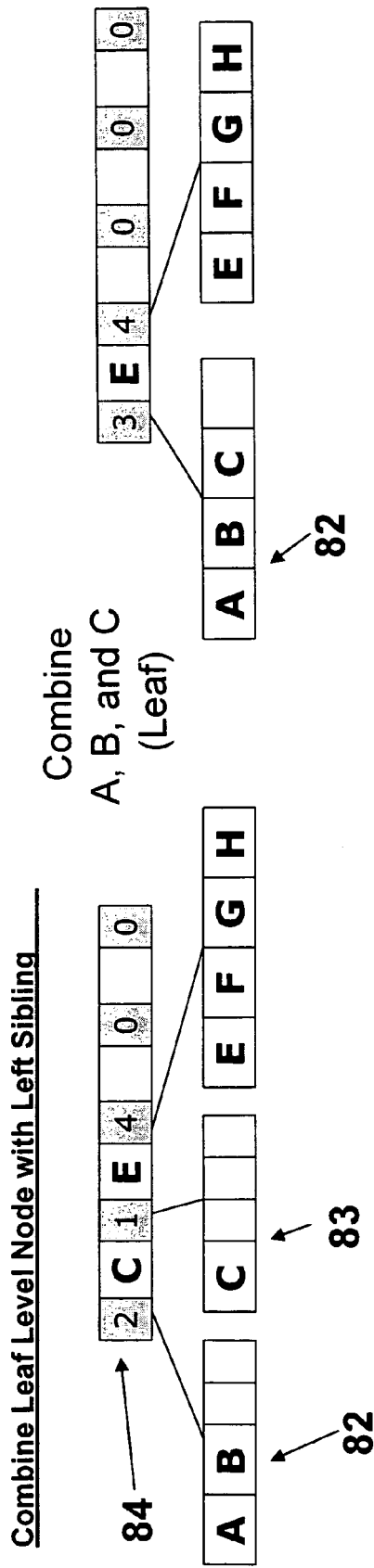
FIG. 8 an illustration of combining leaf nodes and updating leaf-level-count elements values in accordance with an exemplary embodiment of the present invention.

FIG. 8 an illustration of combining leaf nodes 82 and 83 into node 82, and updating leaf-level-count elements values accordingly. Combining nodes is appropriate if a node's values can be moved to either the node's left or right sibling (e.g. if there is enough free space in the left or right sibling). The following examples depict combining nodes with left sibling nodes. Combining nodes with right sibling nodes is similar to combining nodes with left sibling nodes, and is not described below. As depicted in FIG. 8, the node 83 cannot be combined with its right sibling because there is no room in the right sibling. The value "C" is moved into the left sibling node 82, and then node 83 is deleted. That node's (83) referencing item in the parent node is deleted (e.g. the item with value 'C' is deleted from the parent node). Finally, the left and right leaf counts in node 84 are updated—e.g., by the process described below in FIG. 12. As shown in FIG. 8, the updated b-tree structure comprises left and right leaf count values indicating the number of values in the leaf nodes, and each left/right-leaf count value represents, or indicates, a root node of a sub-tree. For example, updated node 84 comprises leaf-count values of 3 and 4, indicative of nodes having valued elements, ABC and EFGH, respectively.

FIG. 9 is an illustration of combining a non-leaf node 86 with its left sibling 85 to form combined node 87. Node 86, containing the value "I" does not have a right sibling, so it is combined with its left sibling node 85. The value "G" is demoted from the root node into the left sibling node 85 and the value "I" is appended to the left sibling node 85 and the pointers to the child nodes that contain "G", "H", and "I", "J" are moved into the left sibling node 85. Because the value "G" was deleted from the root node, the root node is now empty and is deleted. The original left sibling node 85 becomes the new root node 87 of the tree. Collapsing the root is appropriate when there are no more values in the root node. As shown in FIG. 9, the updated b-tree structure comprises left and right leaf count values indicating the number of values in the leaf nodes, and each left/right-leaf count value represents, or indicates, a root node of a sub-tree. For example, node 87 comprises leaf-count values of 2, 2, 2, 2, and 2, indicative nodes having valued elements, AB, CD, EF, GH, and IJ, respectively.

Two examples of redistributing values in nodes are described below. There are many ways to redistribute values between a node and its siblings. One may move some values from only the left sibling, or one may move some values from only the right sibling, or one may move values from both siblings. The following two examples describe redistribution of one value from a sibling, and it will be understood that the process demonstrated can be generalized to perform distribution of more than one value.

Figure 10:
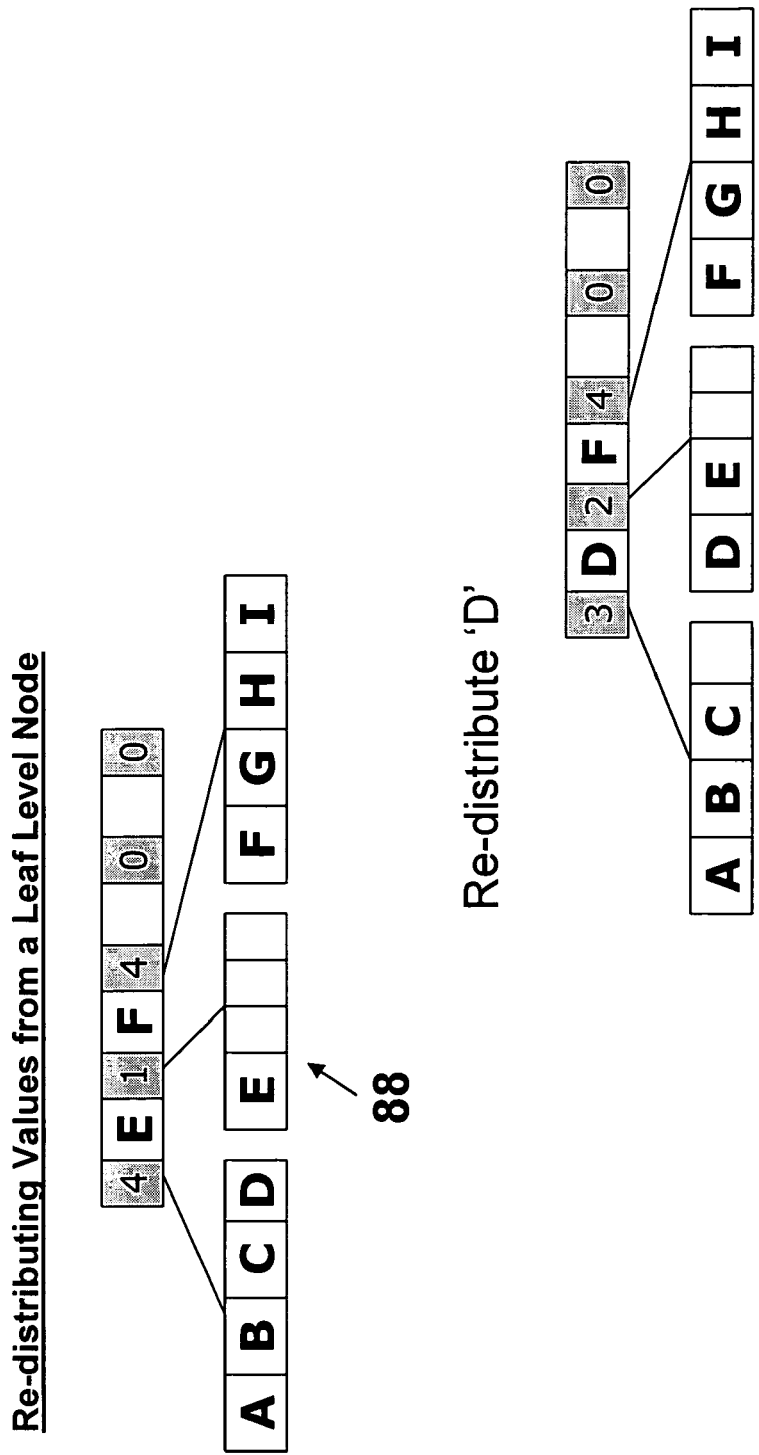
FIG. 10 is an illustration of redistributing values for a leaf level node and updating leaf-level-count elements in accordance with an exemplary of the present invention.

FIG. 10 is an illustration of redistributing values for a leaf level node. The leaf level node 88 has one value 'E'. Assuming node 88 has reached its shrink threshold (e.g. one value), then it is shrunk. Because both of node 88's siblings are full, values are redistributed from one of the nodes siblings. In this example, values are shared with the left sibling, however, this could just as easily been the right sibling. To re-distribute values, the value "D" is shifted from the left sibling and inserted into the node that contains the value "E". Next, the value in the parent node is updated with the value "D" to reflect the correct shift of values. This makes the parent node reflect the correct sort order in the leaf nodes. Finally, the leaf counts are updated in the parent/root node. As shown in FIG. 10, the updated b-tree structure comprises left and right leaf count values indicating the number of values in the leaf nodes, and each left/right-leaf count value represents, or indicates, a root node of a sub-tree. For example, the root node of the re-distributed b-tree comprises leaf-count values of 3, 2, and 4, indicative of nodes having valued elements, ABC, DE, and FGHI, respectively.

Figure 11:
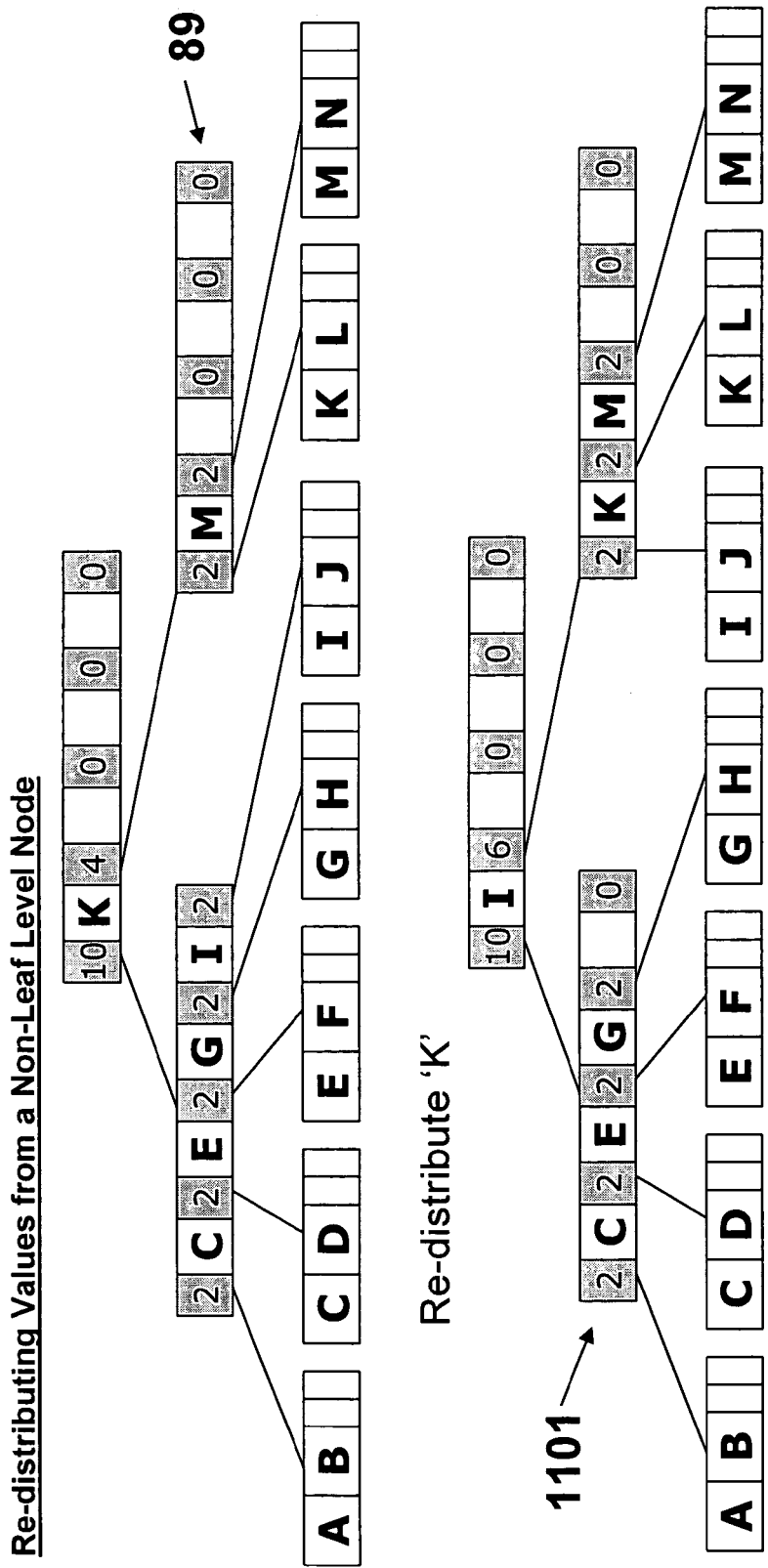
FIG. 11 is an illustration of redistributing values from a non-leaf level node and updating leaf-level-count elements in accordance with an exemplary embodiment of the present invention.

FIG. 11 is an illustration of redistributing values from a non-leaf level node. The non-leaf level node 89 has one value "M". Assuming this node 89 has reached its shrink threshold, and because it can not be combined with its left sibling and because there is no right sibling, the values are redistributed from the left non-leaf sibling. The value "K'" is demoted from the root node into the non-leaf node 89 that contains "M". Next, the last value, "I", in the left sibling is promoted into the root node. Finally, child node pointers are updated in the node that contains "K" and "M" and all of the leaf counts are updated in all of the affected nodes. As shown in FIG. 11, the updated b-tree structure comprises left and right leaf count values indicating the number of values in the leaf nodes, and each left/right-leaf count value represents, or indicates, a root node of a sub-tree. For example, node 1101 comprises leaf-count values of 2, 2, 2, and 2, indicative of nodes having valued elements, AB, CD, EF, and GH, respectively.

Figure 12:
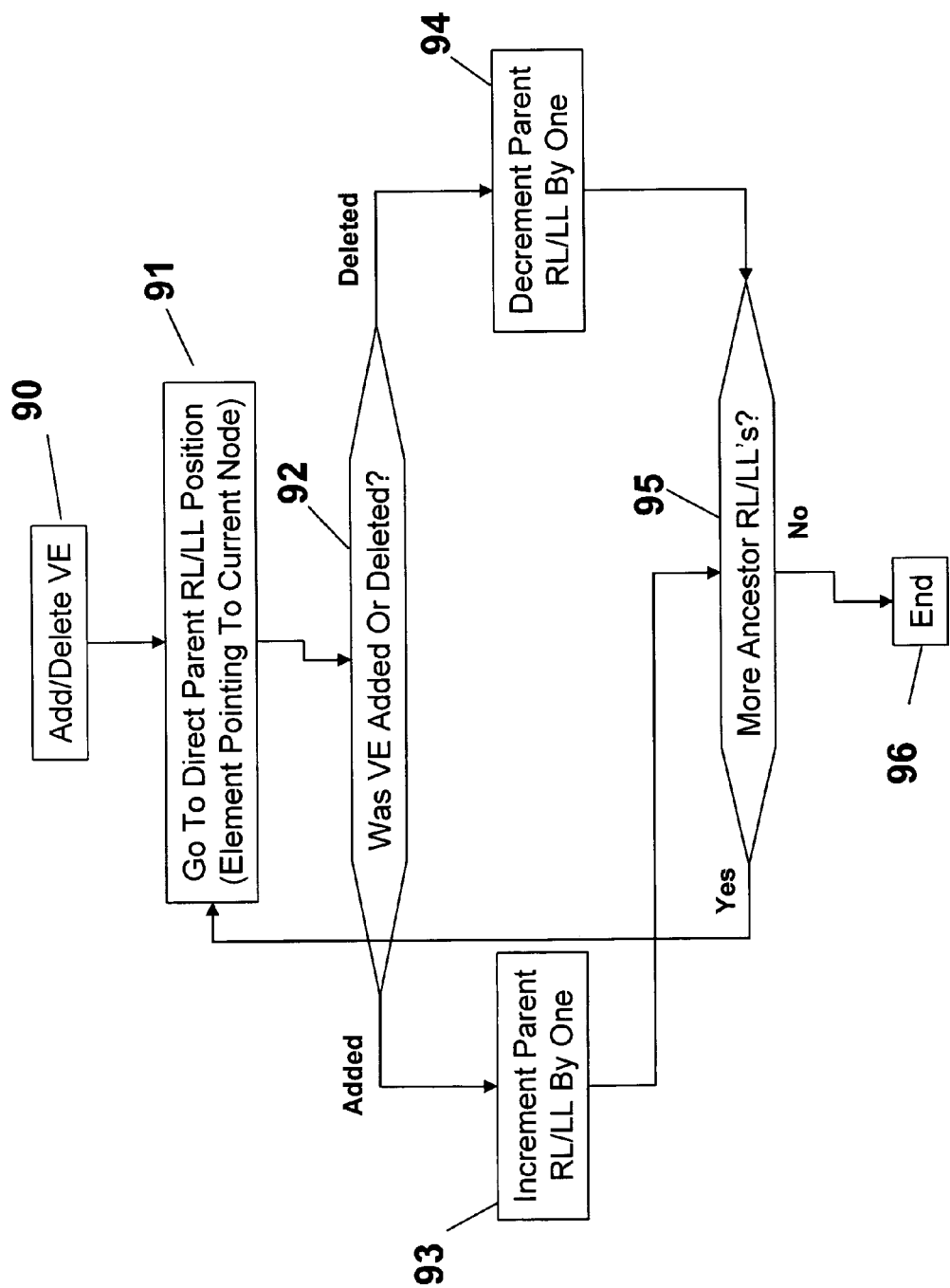
FIG. 12 is a flow diagram for updating values in leaf-level-count-elements in a b-tree in accordance with an exemplary embodiment of the present invention.

FIG. 12 is a flow diagram of an exemplary process for updating values in leaf-level-count-elements in a b-tree. The process depicted in FIG. 12 applies to a b-tree that has already had a valued element inserted or deleted, and contains left and right counts as described above. At step 90, a valued element is added or deleted. The b-tree is then traversed back to the direct parent leaf-level-count element at step 91. That is, the process proceeds to the leaf-level-count element that references the current node in which the valued element was deleted or added. At step 92, it is determined if a valued element was added or deleted. If a valued element was added, the value of the current leaf count is incremented by one at step 93. Note, the current leaf count referred to in steps 93 and 94, is the direct parent leaf-level-count elements referred to in step 91. If a valued element was deleted, the current leaf count element is decremented by one, at step 94. Next, at step 95, it is determined if an ancestor node exists. That is, it is determined if the current leaf-level-count element referenced by a parent leaf-level-count element. If so, then the process proceeds to step 91 and performs as described above. If no ancestor node exists, the process is complete at step 96.

A method for positional access of a b-tree as described herein may be embodied in the form of computer-implemented processes and system for practicing those processes. A method for positional access of a b-tree as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for positional access of a b-tree as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While embodiments of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A computer readable medium comprising at least one of volatile and non-volatile storage having computer program code stored thereon for directing a computer processor to locate an element located at a predetermined position of a balanced tree (b-tree), said program code comprising:
   a traverse b-tree code segment for causing said computer processor to traverse elements in a root node of said b-tree from left to right;
   a compare code segment for causing said computer processor to, at each encountered element having a value (valued element), compare a value of said predetermined position with a value indicated by a left-leaf-count element and a value indicated by a right-leaf-count element;
   a select code segment for causing said computer processor to select a sub-tree of said b-tree in accordance with results of said act of comparing;
   a traverse sub-tree code segment for causing said computer processor to traverse elements in a root node of said selected from left to right;
   a repeat code segment for causing said computer processor to repeat the acts of comparing, selecting, and traversing elements in a root node of a selected sub-tree, until said leaf level of said b-tree is encountered; and
   a locate code segment for causing said computer processor to locate said predetermined position of said element in said leaf level of said b-tree in accordance with:
   said value of said predetermined position; and
   traversed left-leaf-count elements;
   a determine code segment for causing said computer processor to determine if said value of said predetermined position is greater than a sum of all left-leaf-level count element values in said root node of said b-tree and all right-leaf-level count element values in said root node of said b-tree; and
   an indicate code segment for causing said computer processor to indicate that said predetermined position value is out of range if said value-of said predetermined position is greater than said sum.

2. A computer readable medium comprising at least one of volatile and non-volatile storage having computer program code stored thereon for directing a computer processor to locate an element located at a predetermined position of a balanced tree (b-tree), said program code comprising:
   a traverse b-tree code segment for causing said computer processor to traverse elements in a root node of said b-tree from left to right;
   a compare code segment for causing said computer processor to, at each encountered element having a value (valued element), compare a value of said predetermined position with a value indicated by a left-leaf-count element and a value indicated by a right-leaf-count element;
   a select code segment for causing said computer processor to select a sub-tree of said b-tree in accordance with results of said act of comparing;
   a traverse sub-tree code segment for causing said computer processor to traverse elements in a root node of said selected from left to right;
   a repeat code segment for causing said computer processor to repeat the acts of comparing, selecting, and traversing elements in a root node of a selected sub-tree, until said leaf level of said b-tree is encountered; and
   a locate code segment for causing said computer processor to locate said predetermined position of said element in said leaf level of said b-tree in accordance with:
   said value of said predetermined position;
   traversed left-leaf-count elements;
   wherein:
      said act of comparing comprises:
         determining if said predetermined position value is less than or equal to a first sum of:
            a value of a left-leaf-level count element positioned adjacent and left of said encountered valued element; and
            a value of a skipcount counter indicative of an accumulated value of all previously traversed right and left-leaf-level count element values, said skipcount counter being initialized to zero prior to a first traversal of a left-leaf-level count element;
         if said predetermined position value is less than or equal to said first sum, selecting a sub-tree; and
         if said predetermined position is greater than said first sum:
            incrementing said skipcount value by a value of a most recently traversed left-leaf-level count element; and
            determining if said predetermined position value is less than or equal to a second sum of:
               a value of a right-leaf-level count element positioned adjacent and right of said encountered valued element; and
               said skipcount value;
            if said predetermined position value is less than or equal to said second sum:
               incrementing said skipcount value by a value of a most recently traversed right-leaf-level count element;
               traversing from left to right to a next encountered valued element; and
               repeating said act of comparing starting at said act of determining if said predetermined position value is less than or equal to said second sum.

3. A computer readable medium in accordance with claim 2, wherein said act of selecting comprises:
   selecting a sub-tree indicated by a left-leaf-level count element positioned adjacent and left of said encountered valued element if said predetermined position value is less than or equal to said first sum; and
   selecting a sub-tree indicated by a right-leaf-level count element positioned adjacent and right of said encountered valued element if said predetermined position value is greater than said second sum.

* * * * *